United States Patent
Nagesharao et al.

(10) Patent No.: US 10,110,501 B2
(45) Date of Patent: Oct. 23, 2018

(54) TENANT CONTROL IN INITIATING ATOMIC PLATFORM TASKS

(71) Applicant: Microsoft Technology Licensing, LLC, Redmond, WA (US)

(72) Inventors: Pavithra Tyamagondlu Nagesharao, Redmond, WA (US); James E. Johnson, Bellevue, WA (US); Luis Irun-Briz, Sammamish, WA (US); Sushant Pramod Rewaskar, Redmond, WA (US); Ajay Mani, Woodinville, WA (US); Saad Syed, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 596 days.

(21) Appl. No.: 14/324,511

(22) Filed: Jul. 7, 2014

(65) Prior Publication Data

US 2016/0006666 A1  Jan. 7, 2016

(51) Int. Cl.
*G06F 8/60* (2018.01)
*H04L 12/911* (2013.01)
(Continued)

(52) U.S. Cl.
CPC .............. *H04L 47/70* (2013.01); *G06F 8/60* (2013.01); *G06F 9/5038* (2013.01); *G06Q 10/0633* (2013.01)

(58) Field of Classification Search
CPC .................................. G06F 8/60; H04L 47/70
(Continued)

(56) References Cited

U.S. PATENT DOCUMENTS

| | | | | |
|---|---|---|---|---|
| 2008/0104573 | A1* | 5/2008 | Singla ................. | G06F 11/3688 717/120 |
| 2012/0016713 | A1* | 1/2012 | Wilcock ................ | G06F 9/5038 705/7.27 |

(Continued)

FOREIGN PATENT DOCUMENTS

WO    2011046559 A1    4/2011

OTHER PUBLICATIONS

"International Search Report & Written Opinion Received For PCT Application No. PCT/US2015/039177", dated Oct. 14, 2015, 9 Pages.

(Continued)

*Primary Examiner* — Syling Yen
(74) *Attorney, Agent, or Firm* — Workman Nydegger

(57) ABSTRACT

Tenant and server platform coordination of the performance of atomic tasks that are to be performed by the platform, but which have at least a potential impact on the tenant. The server platform allows a particular tenant a timeframe within which the tenant itself may approve of initiation of each of one or more tasks. The server platform may protect itself from delayed action by imposing time constraints on the timeframe such that after the timeframe is elapsed, the tenant no longer has control over triggering the initiation of the particular task. Accordingly, the tenant is provided with flexibility on controlling initiation of a task performed by the server platform, while the server platform maintains a level of control to protect its resources and balances the needs of the various tenants.

23 Claims, 4 Drawing Sheets

Computing System 100

(51) Int. Cl.
*G06F 9/50* (2006.01)
*G06Q 10/06* (2012.01)

(58) Field of Classification Search
USPC .............................. 707/781; 709/223; 726/28
See application file for complete search history.

(56) References Cited

U.S. PATENT DOCUMENTS

2013/0151681 A1* 6/2013 Dournov .................. G06F 8/67
709/223
2013/0276142 A1* 10/2013 Peddada ................ G06F 21/62
726/28

OTHER PUBLICATIONS

Shue, et al., "Performance Isolation and Fairness for Multi-Tenant Cloud Storage", 10th USENIX Symposium on Operating Systems Design and Implementation (OSDI '12), Proceeding: OSDI'12 Proceedings of the 10th USENIX conference on Operating Systems Design and Implementation; pp. 349-362; USENIX Association Berkeley, CA, USA © 2012.
"Second Written Opinion Issued in PCT Application No. PCT/US2015/039177", dated May 30, 2016, 8 Pages.
"International Preliminary Report on Patentability Issued in PCT Application No. PCT/US2015/039177", dated Oct. 24, 2016, 9 Pages.
"TaskScheduler: Execution Scheduling Through ScheduledServices" Updated Mar. 16, 2011, Accessed Jul. 3, 2014.

* cited by examiner

400

| Task | Timeframe | Mean Time To Recover |
|------|-----------|----------------------|
| A | 15 Minutes | 10 Min. |
| B | 15 Day | 1 Hour |
| C | — | 3 Days |

| Component | Status |
|-----------|--------|
| R1 | Running |
| R2 | Not Running |
| R3 | Running |
| R4 | Not Running |

*Figure 5*

TENANT CONTROL IN INITIATING ATOMIC PLATFORM TASKS

BACKGROUND

Computing systems and associated networks have revolutionized the way human beings work, play, and communicate. Nearly every aspect of our lives is affected in some way by computing systems. Computing systems are now largely connected to networks and the Internet so as to enable widespread communications. The vast capabilities of such computing networks have resulted in the proliferation of a variety of services being offered over networks. Examples of network services include web sites, e-mail, messaging, social networks, database management, virtualization, calendar management, storage, policy management, and so forth.

In one model of computing, a platform hosts multiple tenants (e.g., component programs), each tenant offering their own services to the customers of the provider of the tenant. The platform may be, for example, a server platform, and may be supported by one or more servers. The platform may also be a cloud platform in which the platform has all of the resources of a data center. The cloud platform may be a private cloud, a public cloud, or a hybrid cloud representing some of each.

In any case, when hosting multiple tenants, the platform takes a number of safeguards to make sure that the data of each tenant is protected, and to ensure that enough computing resources are allocated to each tenant. The platform is also aware of the workflows associated with each tenant. As each tenant progresses through its corresponding workflows, the platform ensures that each workflow is followed and that the various tasks of the workflow are successfully accomplished in a timely manner. Accordingly, workflow management is an important role of a platform especially when managing multiple tenants.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to the operation of a server platform (such as a cloud platform) that runs thereon multiple tenants. In particular, the embodiments described herein help the server platform and one or more of its tenants coordinate atomic tasks that are to be performed by the server platform, but which have at least a potential impact on the tenant.

In particular, the server platform allows a particular tenant a timeframe within which the tenant itself may approve of initiation of each of one or more tasks. The tenant may, after all, have information not available to the server platform and that may be relevant to when it might be appropriate to initiate a particular task from the tenant's perspective. The server platform may protect itself from delayed action by imposing time constraints on the timeframe such that after the timeframe is elapsed, the tenant no longer has control over triggering the initiation of the particular task, but rather the server platform takes charge of timing the initiation of the particular task. Accordingly, the tenant is provided with flexibility on controlling initiation of a task performed by the server platform, while the server platform maintains a level of control to protect its resources and balances the needs of the various tenants.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIG. 4 illustrates a designation of tasks and timeframes in accordance with the principles described herein; and FIG. 5 illustrates an example of supplemental information in accordance with principles described herein.

DETAILED DESCRIPTION

At least some embodiments described herein relate to the operation of a server platform (such as a cloud platform) that runs thereon multiple tenants. In particular, the embodiments described herein help the server platform and one or more of its tenants coordinate atomic tasks that are to be performed by the server platform, but which have at least a potential impact on the tenant.

In particular, the server platform allows a particular tenant a timeframe within which the tenant itself may approve of initiation of each of one or more tasks. The tenant may, after all, have information not available to the server platform and that may be relevant to when it might be appropriate to initiate a particular task from the tenant's perspective. The server platform may protect itself from delayed action by imposing time constraints on the timeframe such that after the timeframe is elapsed, the tenant no longer has control over triggering the initiation of the particular task, but rather the server platform takes charge of timing the initiation of the particular task. Accordingly, the tenant is provided with flexibility on controlling initiation of a task performed by the server platform, while the server platform maintains a level of control to protect its resources and balances the needs of the various tenants.

Some introductory discussion of a computing system will be described with respect to FIG. 1. Then, supporting architectures and methods using the principles described herein will be described with respect to subsequent figures.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
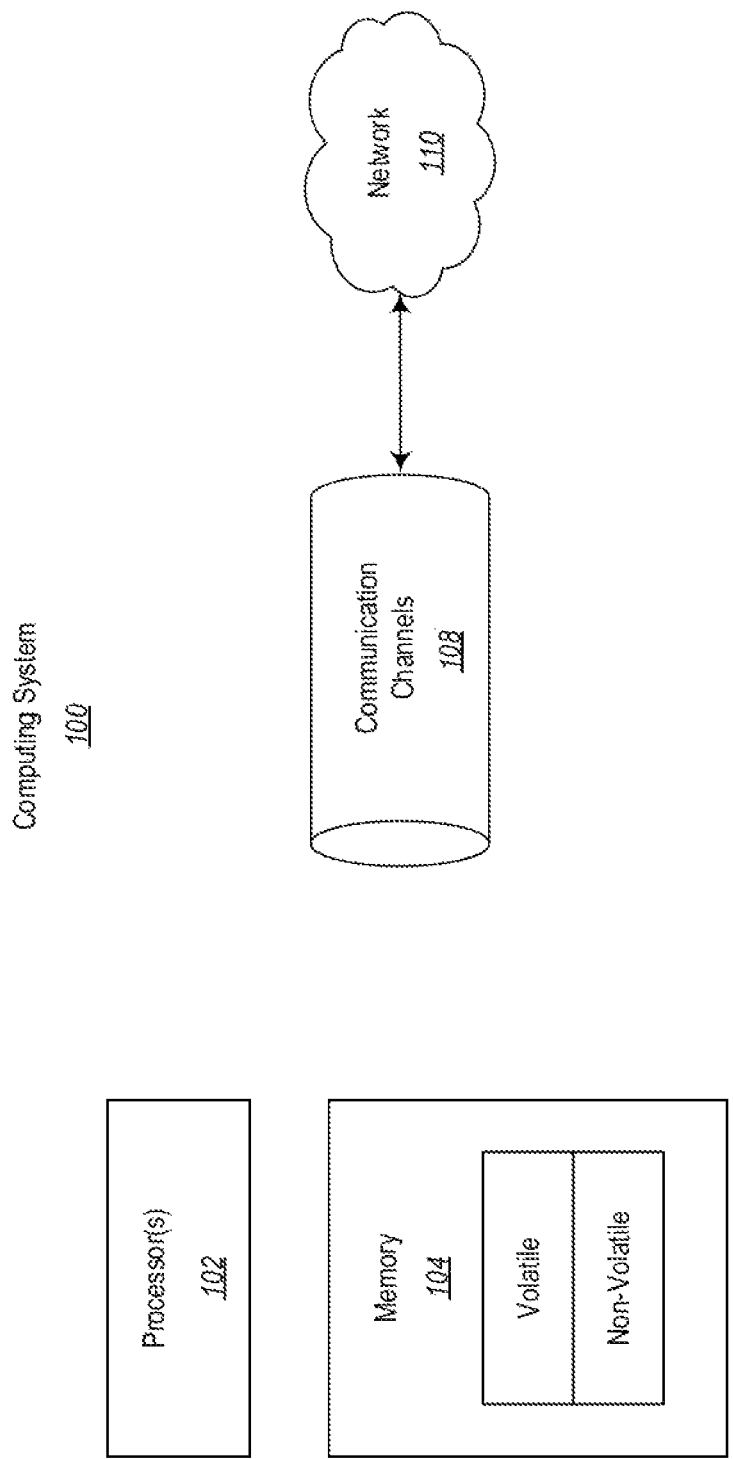
FIG. 1 abstractly illustrates a computing system in which some embodiments described herein may be employed.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other storage medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries or even instructions that undergo some translation (such as compilation) before direct execution by the processors, such as intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
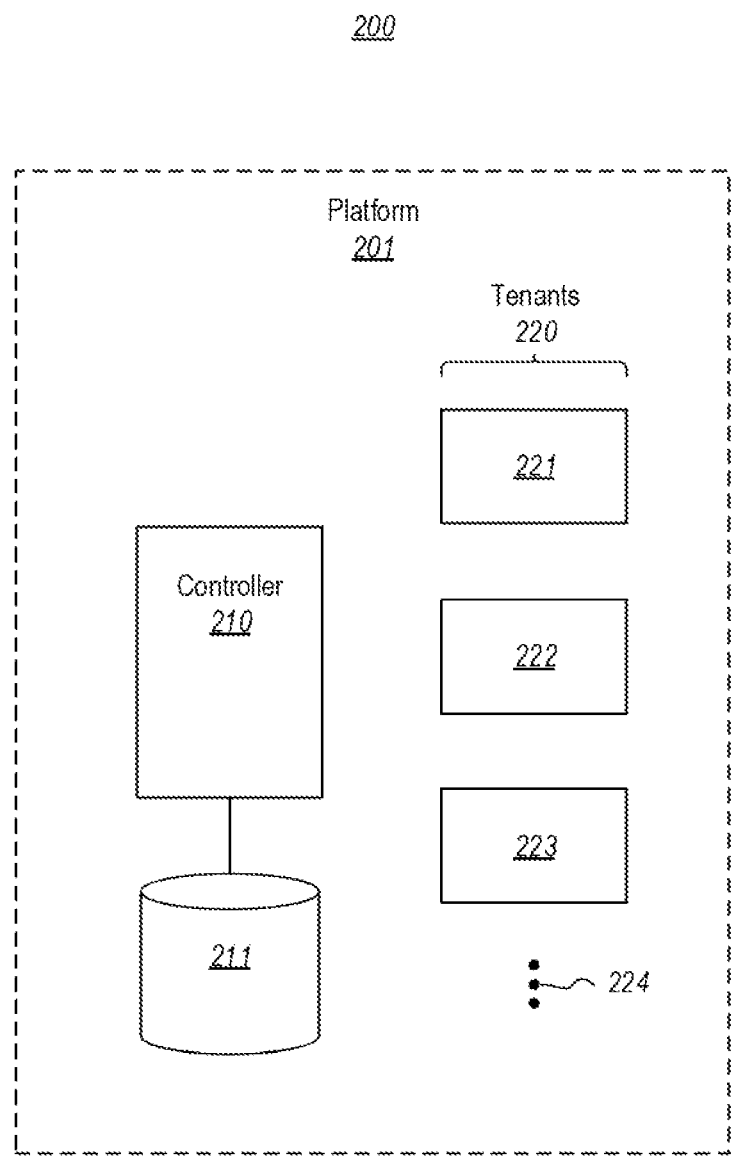
FIG. 2 illustrates an environment in which the principles described may be employed, including a server platform in which multiple tenants run.

FIG. 2 illustrates an environment 200 in which the principles described may be employed. The environment 200 includes a server platform 201 in which multiple tenants 220 run. Each tenant may be, for instance, the software associated with a service provider that is running a service in the environment 200. For instance, the server platform 201 could be a single server, multiple distributed servers, or a cloud computing environment constituting a public cloud, a private cloud, or a hybrid cloud. The server platform 201 may be structured as described above for the computing system 100 of FIG. 1, albeit likely being quite distributed if in a cloud computing environment.

The server platform 201 keeps track of the workflow status of each of the tenants 220, and performs atomic tasks towards the aim of completing the workflow status of each tenant. As time progresses, either the server platform 201 may initiate a workflow with respect to a particular tenant, or that particular tenant may ask that a workflow be initiated.

For tenant initiated workflows, the server platform 201 may coordinate with the tenant to initiate and continue the workflow. For instance, suppose the tenant determines that some of the tenant's role instances are to be updated to a new version. The tenant may communicate this intention to the server platform 201. Then, the server platform 201 presents this action back to the tenant for approval. The reason for presenting the tenant-requested action back to the tenant for approval is that at the time of tenant expresses the intention, there may not be any server platform initiated actions. By the time server platform 201 is ready to perform tenant initiated action, there might be other platform initiated actions. So, at this time, the tenant might want to control when the instances are upgraded in the context of other pending actions that may potentially have shorter time constraints.

The server platform 201 has access to a workflow status store 211 that assists in tracking the current active workflows with respect to each tenant, and the structure of the workflow itself (so as to identify the next task to be performed in each workflow).

Powerful server platforms are often capable of hosting hundreds or thousands of tenants. However, in the illustrated embodiment, for purposes of simplicity and clarity only, there are only three tenants 221, 222 and 223 illustrated. However, the ellipses 224 symbolically represent that there may be any number of tenants operating within the platform without departing from the spirit or scope of the principles described herein. Accordingly, the principles described herein are not limited to the actual number of tenants operating within the platform, and even the number of tenants is not static as tenants are added or removed from the platform.

Such tenants might be entirely unrelated. For instance, one tenant may provide an e-mail service for an enterprise, another might provide a web site on which customers globally may order products, and yet another might be a blog service that caters to the topics of animal and pet care. The server platform 201 maintains proper data separation between each of the tenants so as to honor each tenant's ownership of the data and privacy, and also allocates proper processing resources towards the accomplishment of the active workflows associated with each tenant.

Figure 3:
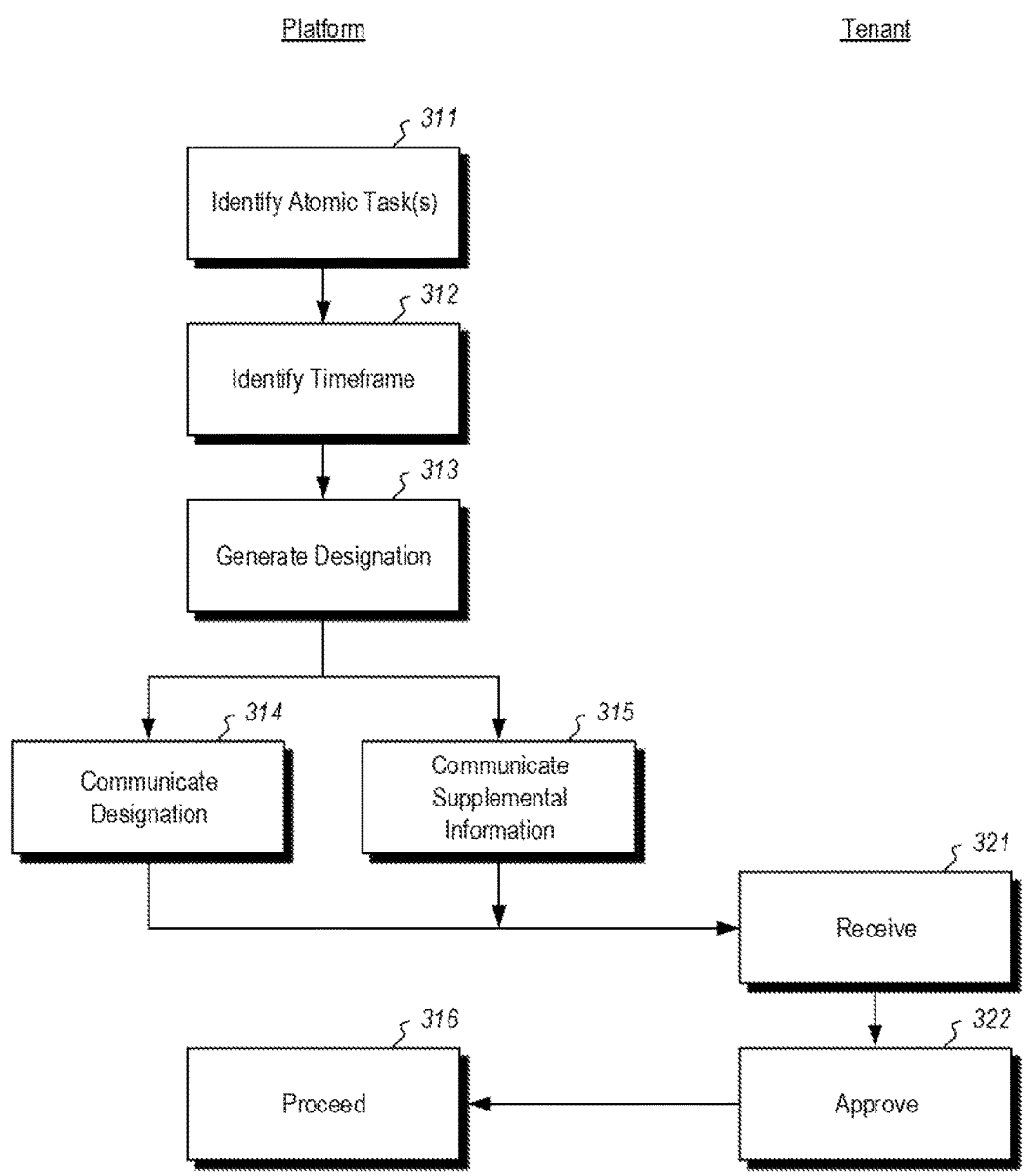
FIG. 3 illustrates a flowchart of a method for scheduling a particular atomic task in a server platform that includes at least one tenant.

FIG. 3 illustrates a flowchart of a method 300 for scheduling a particular atomic task in a server platform that includes at least one tenant. Some of the acts of the method 300 are performed by the server platform 201 of FIG. 2 (or perhaps specifically by the controller 210) and are illustrated in the left column of FIG. 3 under the heading "Platform". Others of the acts of the method 300 are performed by the corresponding tenant (e.g., tenant 221) as represented in the right column of FIG. 3 under the headline "Tenant". The method 300 may be performed repeatedly with respect to a given tenant perhaps when new tasks are to be performed that may have impact on the tenant.

The method 300 is initiated upon the platform identifying one or more (potentially multiple) atomic tasks (act 311) that are to be performed by the server platform, but which at least potentially affect the particular tenant. For instance, with reference to FIG. 2, an in an example referring to hereinafter as the "specific case example", suppose the controller 210 of the platform 201 determines that the platform 201 is to perform four tasks called hereinafter task A, task B, task C and task D that could potentially affect the tenant 221. Examples of tasks that the platform might perform that might impact the tenant include rebooting the physical machine upon which all or part of the tenant is operating, reinitializing a virtual machine that runs all or part of the tenant, updating a software component of the tenant, updating a configuration of the tenant, adding or removing resources available to the tenant, and so forth.

In one embodiment, the tasks are identified by the platform controller 210 by evaluating the workflows stored in the workflow status store 211. For instance, the platform controller 210 might evaluate active and new workflows for the tenant 221, and determine which atomic task is next based on that workflow status. A workflow might be as simple as a single atomic task, or might involve multiple atomic tasks that have some temporal relationship on when they should or can be performed. The workflow for the tenant 221 might have been initiated at the direction of either the platform 201 or the tenant 221. In some cases, to find tasks that might affect a given tenant, the platform controller 210 might even look into workflows outside of those actively assigned to the tenant. For instance, if a particular task involves the physical reboot of a machine that has three virtual machines running thereon, each serving different tenants, the task of rebooting may be thought of as having an impact on each of those tenants. In the case of a task involving shutting down a virtual machine, perhaps just the tenant that was being run by the virtual machine is determined as affected. Thus, in this description and in the claims, when the platform provides control over the initiation of a task to a particular tenant, that particular tenant might share such control with one or more other tenants.

For some of the tasks, but not necessarily all, the platform might allow the affected tenant to have some control over when to initiate the corresponding task. In this way, the tenant provides endorsement of the initiation of the corresponding task. For instance, in the specific case example, suppose that the platform 210 determines that task D is simply to be moved forward on, while the platform determines that the tenant 221 is to have some control over when the tasks A, B and C are to be initiated. For those tasks that the platform determines the tenant may have some control over initiation of the task, the platform controller also identifies a timeframe within which the tenant can have control over the initiation of the particular task (act 312). This timeframe may be thought of as a timeout, after which the platform might initiate the task at any time.

The identified timeframe may depend on the urgency of the task to the platform and to the tenant. For instance, if a task is to be performed urgently (such as is the case for task D), then perhaps the platform never gives control to the tenant. However, for tasks that are slightly less urgent, the timeframe is relatively short. In general, the less urgent the task is to the platform, the longer the timeframe may be. The timeframe might even be infinite, in which case the tenant has unfettered discretion on when the platform is to initiate the task. The timeframe may vary by tenant. For instance, some tenants may have higher levels of service offered by the platform. Such tenants may be granted generally longer timeframes for instructing the platform to initiate the task.

The platform then generates a designation (act 313) of the one or more atomic tasks that are to be performed by the platform, but which at least potentially affect the tenant. In the specific case example with respect to FIG. 2, the controller 210 creates the designation and identifies tasks A, B and C within that designation.

The controller also determined a timeframe for each task and included that within the designation. For instance, perhaps the timeframe for task A is 15 minutes, the timeframe for task B is 15 days, and the timeframe for task C is blank (perhaps implicitly communicating an infinite timeframe having no ending). Thus, the platform controller 210 has determined that it is willing to wait 15 minutes to perform task A to allow the tenant 221 discretion within that 15 minute period on when to have the platform start task A. Likewise, the platform controller 210 has determined that it is willing to wait 15 days to perform task B to allow the tenant 221 discretion within that 15 day period on when to have the platform start task B. Finally, the platform controller 210 has determined that it is willing to as long as tenant 221 likes to perform task C. For instance, perhaps task C has no impact on the platform as a whole and only impacts the tenant 221.

The designation that includes the identity of the acts and any corresponding timeframes is then communicated to the particular tenant that the acts effect (act 314). For instance, this might be done in a single communication. Likewise, optionally, the platform also provides supplemental information (act 315) to assist the particular tenant in deciding when to approve of the particular task. For instance, in the specific case example, the controller 210 causes a communication (perhaps a single communication) that identifies tasks A, B and C and, if applicable, their associated timeframe, to the tenant 221. For instance, FIG. 4 illustrates an example table that might be communicated to the tenant. Here, the table includes an identification of each task A, B and C. Furthermore, for each task, the timeframe is communicated. The server platform 201 might also change the timeframe or even revoke the act to be performed. This might be provided in a separate communication from the server platform 201 to the respective tenant.

In that communication of acts 314 and 315, the platform controller 210 might also communicate the supplemental information. The supplemental information might again include any information helpful to the tenant to decide when to have the platform initiate the corresponding task. For instance, for any given task, the supplemental information might include task-specific information such as an estimated or mean time to recovery in performing the task, an expected or mean time that the task is initiated by the platform once the instruction to initiate is detected. For instance, in FIG. 4, each task also includes a mean time for recovery. The supplemental information might also include other consequences of the execution of the task, such as availability of data, storage access speeds, memory usage, processor utilization, and the like.

The supplemental information might also include tenant specific information. For instance, the platform controller might specify an estimated health of the tenant from the viewpoint of the platform, a state of the particular tenant (e.g., the version of various software running on the tenant), a configuration of the tenant, and so forth. For instance, FIG. 5 illustrates a health table that might be communicated to the tenant specifying a health status (in this case whether or not the component is running) for each of four components of the tenant.

The tenant then optimally receives the designation (act 321). Accordingly, in the specific case example, the tenant 221 receives the designation of tasks A, B and C from the platform controller 210. Accordingly, the tenant knows that it has a 15 minute window in which the tenant can control when the task A is performed, a 15 day window in which the tenant can control when the task B is performed, and an unlimited window in which the tenant can control when the task C is performed.

The tenant then approves (act 322) of each task, either by responding with expressed approval of the task within the corresponding timeframe, or by allowing the timeframe to elapse without expressed approval, thereby implicitly approving of the server platform performing the particular atomic task. In the case of expressed approval, the expressed approval for multiple tasks might be provided in a single communication. For instance, in the specific case example, suppose at the 13 minutes mark, the tenant 221 decides to initiate both tasks A and B. Being within the timeframe on both tasks, the tenant still has that control for both tasks. Accordingly, in a single communication, the tenant 221 may authorize the initiation of tasks A and B.

The platform then determines (act 316) that the server platform is to proceed with performing the particular task based on a response status corresponding to the communication of the designation. For instance, in the specific case example, at the 13 minute mark, the platform controller 210 received an indication from the tenant 221 that the tenant approves of moving forward with tasks A and B. In that case, the server platform moves forward at will. However, suppose that 15 minutes has elapsed with no communication from the tenant 221 regarding task A. At that point, given that response status (of no response received), the platform may then interpret the lack of response as tacit approval to move forward. Accordingly, the platform may move forward with the task A.

This mechanism is resilient to communication problems between the platform and the tenant. For instance, suppose that the designation of the tasks and timeframes were never received by the tenant, and/or that the explicit approval to perform the tasks were never received by the platform. In that case, the platform will still proceed to perform the task even given a complete breakdown of communication between the platform controller and the tenant. For instance, the platform would simply undertake to perform the task once the corresponding timeframe has expired.

The ability to allow the tenant to control when to initiate a particular task that affects that tenant is helpful in that the tenant may have more information relevant to the decision of when to begin a task that might the platform. For instance, if the platform believes that a tenant is not healthy (e.g., is not running), but the tenant knows otherwise, the platform might normally have the tenant take corrective action right away. However, the tenant might be less urgent about it since the tenant knows its own health. Accordingly, this mechanism allows the tenant to use its greater intelligence to defer the task to a more appropriate time given the facts known to the tenant. This has the effect of allowing workflows to proceed at a pace that is more appropriate given the circumstances.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for operating an architecture that improves workflow execution by selectively invoking a greater knowledge of a tenant over a lesser knowledge of a server platform so as to defer a workflow task to a more appropriate time given the tenant's greater knowledge, the method comprising:
- an act of the tenant receiving from the server platform a designation relating to a particular atomic task, the designation indicating (1) that the particular atomic task will be performed by the server platform and (2) that performance of the particular atomic task will potentially affect the tenant;
- an act of the tenant identifying that the server platform is using the designation to pass the tenant at least some control in determining when the particular atomic task is to be performed by the server platform, wherein the tenant retains the at least some control throughout a determined timeframe indicated within the designation, and wherein passing the tenant the at least some control is performed, at least in part, because the tenant has greater knowledge regarding how urgent the particular atomic task is; and
- an act of the tenant approving of the server platform performing the particular atomic task, wherein the tenant's approving is performed within the determined timeframe, and wherein the tenant's approving is at least partially based on an expected time that the server platform will wait after the server platform receives an instruction to initiate the particular atomic task from the tenant,
- whereby, as a result of the server platform coordinating with the tenant as to when the particular atomic task is to be performed, execution of the particular atomic task proceeds at a pace that enables the server platform to use its resources more efficiently by processing tasks in accordance with a determined urgency of those tasks.

2. The method in accordance with claim 1, wherein the act of the tenant approving comprises:
- an act of the tenant waiting until an end of the determined timeframe without sending an explicit communication to the server platform approving of the particular atomic task, thereby implicitly approving of the server platform performing the particular atomic task.

3. The method in accordance with claim 1, wherein the act of the tenant approving comprises:
- an act of the tenant communicating to the server platform an explicit approval of the particular atomic task within the determined timeframe.

4. The method in accordance with claim 1, wherein the designation also relates to a plurality of other atomic tasks.

5. The method in accordance with claim 4, wherein the act of the tenant approving comprises:
- an act of the tenant explicitly approving of each of at least one of the plurality of atomic tasks within a single communication.

6. The method in accordance with claim 5, wherein the act of the tenant approving comprises:
- an act of the tenant explicitly approving of each of at least some of the plurality of atomic tasks within the single communication to the server platform.

7. The method in accordance with claim 1, further comprising:
- an act of the tenant proposing a task to be performed by the server platform, wherein the designation is based at least in part upon the proposed task.

8. A computer program product comprising one or more computer-readable physical storage media having stored thereon computer-executable instructions that are executable by one or more processors to perform a method for operating an architecture that improves workflow execution by selectively invoking a greater knowledge of a tenant over a lesser knowledge of a server platform so as to defer a workflow task to a more appropriate time given the tenant's greater knowledge, the method comprising:
- an act of identifying a particular task that is to be performed by the server platform and that will at least potentially affect the particular tenant;
- an act of generating a designation relating to the particular task, the designation indicating (1) that the particular task will be performed by the server platform and (2) that performance of the task will potentially affect the particular tenant, the designation being usable by the particular tenant to identify that the server platform is using the designation to pass the particular tenant at least some control in determining when the particular task is to be performed by the server platform, wherein the particular tenant retains the at least some control throughout a particular timeframe indicated within the designation, and wherein passing the tenant the at least some control is performed, at least in part, because the tenant has greater knowledge regarding how urgent the particular task is;
- an act of causing the designation to be at least attempted to be communicated to the particular tenant; and
- an act of determining that the server platform is to proceed with performing the particular task based on a response status corresponding to the communication of the designation, wherein the particular tenant generates the response status, and wherein generating the response status is at least partially based on an expected time that the server platform will wait after the server platform receives an instruction to initiate the particular task from the particular tenant,
- whereby, as a result of the server platform coordinating with the tenant as to when the particular task is to be performed, execution of the particular task proceeds at a pace that enables the server platform to use its resources more efficiently by processing tasks in accordance with a determined urgency of those tasks.

9. The computer program product in accordance with claim 8, the act of determining that the server platform is to proceed with performing the particular task being performed in response to receiving an explicit approval from the particular tenant within the particular timeframe.

10. The computer program product in accordance with claim 8, the act of determining that the server platform is to proceed with performing the particular task being performed in response to determining that the particular timeframe has passed without an explicit approval from the particular tenant within the particular timeframe.

11. The computer program product in accordance with claim 8, wherein the particular timeframe is explicitly represented within the designation.

12. The computer program product in accordance with claim 8, the particular timeframe having no ending thereby representing that the particular tenant has continuous control over when the particular task is performed by the server platform.

13. The computer program product in accordance with claim 8, the particular timeframe being revocable by the server platform.

14. The computer program product in accordance with claim 8, the method further comprising:
- an act of providing supplemental information to the particular tenant to assist the particular tenant in deciding when to approve of the particular task.

15. The computer program product in accordance with claim 14, the supplemental information comprising:
   an estimated time to recovery corresponding to the particular task.

16. The computer program product in accordance with claim 14, the supplemental information comprising:
   a server platform estimation of a health of the particular tenant.

17. The computer program product in accordance with claim 14, the supplemental information comprising:
   a state of the particular tenant.

18. The computer program product in accordance with claim 14, the supplemental information comprising:
   a configuration of the particular tenant.

19. A method for operating an architecture that improves workflow execution by selectively invoking a greater knowledge of a tenant over a lesser knowledge of a server platform so as to defer a workflow task to a more appropriate time given the tenant's greater knowledge, the method comprising:
   an act of identifying a particular task that is to be performed by the server platform and that will at least potentially affect the particular tenant;
   an act of generating a designation relating to the particular task, the designation indicating (1) that the particular task will be performed by the server platform and (2) that performance of the task will potentially affect the particular tenant, the designation being usable by the tenant to identify that the server platform is using the designation to pass the particular tenant at least some control in determining when the particular task will be performed by the server platform, wherein the particular tenant retains the at least some control throughout a particular timeframe indicated within the designation, and wherein passing the tenant the at least some control is performed, at least in part, because the tenant has greater knowledge regarding how urgent the particular task is;
   an act of communicating the designation to the particular tenant; and
   an act of determining that the server platform is to proceed with performing the particular task based on a response status corresponding to the communication of the designation, wherein the particular tenant generates the response status, and wherein generating the response status is at least partially based on an expected time that the server platform will wait after the server platform receives an instruction to initiate the particular task from the particular tenant,
   whereby, as result of the server platform coordinating with the tenant as to when the particular task is to be performed, execution of the particular atomic task proceeds at a pace that enables the server platform to use its resources more efficiently by processing tasks in accordance with a determined urgency of those tasks.

20. The method in accordance with claim 19, the particular task being a first atomic task, the particular timeframe being a first timeframe, the method further comprising:
   an act of identifying a second atomic task that will be performed by the server platform and that will potentially affect the particular tenant;
   an act of generating a different designation that relates to the second atomic task and that includes at least an implicit identification of at least a second timeframe in which the particular tenant has control to approve of the server platform performing the second atomic task;
   an act of communicating the different designation to the particular tenant; and
   an act of determining that the server platform is to proceed with performing the second atomic task based on a response status corresponding to the communication of the different designation.

21. The method of claim 19, wherein the method further comprises:
   an act of identifying other tasks that are to be performed by the server platform, the other tasks including a first task that is assigned to a first tenant;
   an act of identifying that the first task, when performed by the server platform, will affect the particular tenant; and
   an act of enabling both the particular tenant and the first tenant to share control over when the first task is to be performed by the server platform.

22. The method of claim 19, wherein a length of the particular timeframe is dependent on a determined urgency of the particular task, whereby tasks that are higher in urgency have shorter timeframes than tasks that are lower in urgency.

23. The method of claim 1, wherein supplemental information is provided to the tenant, the supplemental information describing one or more consequences of executing the particular atomic task, the consequences including a storage access speed.

* * * * *